United States Patent [19]
Toor

[11] Patent Number: 5,344,255
[45] Date of Patent: Sep. 6, 1994

[54] OIL, WATER AND SAND SEPARATOR

[75] Inventor: Irfan A. Toor, Plano, Tex.

[73] Assignee: Itex Enterprises, Inc., Addison, Tex.

[21] Appl. No.: 816,486

[22] Filed: Jan. 3, 1992

[51] Int. Cl.⁵ .............................. B09B 3/00; B08B 7/04
[52] U.S. Cl. ...................................... 405/128; 134/10;
   134/25.1; 134/109; 210/767; 405/303
[58] Field of Search ............... 405/128, 129, 258, 263,
   405/303; 134/10, 25.1, 109, 110; 210/767, 787,
   800

[56] References Cited

U.S. PATENT DOCUMENTS

| | | |
|---|---|---|
| 807,971 | 12/1905 | Skinner, Jr. |
| 1,580,723 | 4/1926 | Hapgood |
| 1,841,863 | 1/1932 | Rijswijk |
| 2,009,559 | 7/1935 | Mieder ............................ 209/208 |
| 2,903,407 | 9/1959 | Fischer et al. .................. 208/11 |
| 2,973,312 | 2/1961 | Logan ............................ 208/11 |
| 3,030,118 | 4/1962 | Groce ............................ 277/4 |
| 3,041,267 | 6/1962 | Frame et al. ................... 208/11 |
| 3,084,943 | 4/1963 | Weis .............................. 277/4 |
| 3,088,744 | 5/1963 | Ezekiel et al. ................. 277/3 |
| 3,089,423 | 5/1963 | Raub et al. .................... 103/87 |
| 3,115,347 | 12/1963 | Lennon ........................... 277/59 |
| 3,163,929 | 1/1965 | Goodstein ....................... 29/403 |
| 3,172,671 | 3/1965 | Downs ............................ 277/137 |
| 3,226,202 | 12/1965 | Nagelvoort ....................... 23/267 |
| 3,471,157 | 10/1969 | Swearingen ...................... 277/17 |
| 3,544,369 | 12/1970 | Keogh, Jr. ...................... 134/25 |
| 3,639,172 | 2/1972 | Keogh, Jr. ...................... 134/25 |
| 3,734,776 | 5/1973 | Keogh, Jr. ...................... 134/25 |
| 3,802,916 | 4/1974 | Jackson .......................... 134/10 |
| 3,846,173 | 11/1974 | Ihrig ............................ 134/10 |
| 4,063,743 | 12/1977 | Petros ........................... 277/63 |
| 4,120,775 | 10/1978 | Murray et al. ................... 208/11 |
| 4,136,886 | 1/1979 | Sjoholm et al. .................. 277/24 |
| 4,239,422 | 12/1980 | Clancey .......................... 406/47 |
| 4,300,772 | 11/1981 | Nissel ........................... 277/2 |
| 4,311,561 | 1/1982 | Hastings ......................... 196/14.52 |
| 4,324,652 | 4/1982 | Hack ............................. 209/3 |
| 4,416,764 | 11/1983 | Gikis et al. .................... 208/11 |
| 4,424,081 | 1/1984 | Giguere .......................... 134/10 |
| 4,501,430 | 2/1985 | Kuhl et al. ..................... 277/59 |
| 4,501,671 | 2/1985 | Bazell ........................... 210/781 |
| 4,502,693 | 3/1985 | Lesiecki et al. ................. 277/3 |
| 4,606,774 | 8/1986 | Morris ........................... 134/10 |
| 4,802,978 | 2/1989 | Schmit et al. ................... 210/104 |
| 4,865,333 | 9/1989 | Winslow ......................... 277/28 |
| 4,969,775 | 11/1990 | Cappel et al. ................... 405/128 |
| 4,984,811 | 1/1991 | Kuwabara et al. ................. 277/3 |
| 4,993,873 | 2/1991 | Tippmer ......................... 405/128 |
| 5,098,224 | 3/1992 | Netzel et al. ................... 405/128 |

FOREIGN PATENT DOCUMENTS 0161698 11/1985 European Pat. Off. .

(List continued on next page.)

OTHER PUBLICATIONS

EPA Handbook, Remediation of Contaminated Sediments, EPA 1625/6-91/028, U.S. Environmental Protection Agency, Washington, D.C. (Apr. 1991).

(List continued on next page.)

Primary Examiner—David H. Corbin
Attorney, Agent, or Firm—Fish & Richardson

[57] ABSTRACT

Oil, water and sand are separated from soil by screening and separation of coarse particles, agitating the soil in a solution of non-ionic biodegradable detergent to promote emulsification of the oil, separating sand from the emulsion, separating the oil in the emulsion from the detergent solution in a coalescing filter, and recycling the detergent solution. Preferably the soil and detergent solution is agitated first at low speed to separate any aggregate from the soil, and to provide a homogenized mixture of the soil and the detergent solution, and then agitating the homogenized mixture of the soil and the detergent at high speed to transfer the oil from the soil into an emulsion with the detergent solution. For reduced maintenance of the coalescing filter, the emulsion is passed through a hydrocyclone for removing fines before the emulsion is passed to the coalescing filter. In a preferred arrangement having one additional washing stage, the sand removed from the settling tank is fed along with fines from the hydrocyclone to the additional washing stage, where the sand is washed with secondary stage wash liquid. The sand is removed from the wash liquid, and the wash liquid is fed to a flocculation tank, where contaminated fines settle and are removed from the wash liquid. The secondary stage wash liquid is recycled from the flocculation tank.

23 Claims, 10 Drawing Sheets

FOREIGN PATENT DOCUMENTS

| | | |
|---|---|---|
| 0172056 | 2/1986 | European Pat. Off. . |
| 0391748 | 10/1990 | European Pat. Off. . |
| 3513673 | 10/1986 | Fed. Rep. of Germany . |
| 3910842 | 10/1990 | Fed. Rep. of Germany . |
| 335915 | 6/1903 | France . |
| 8904221 | 5/1989 | PCT Int'l Appl. . |

OTHER PUBLICATIONS

EPA Contaminated Sediments Seminar Speaker Slide Copies, CERI-91-19, U.S. Environmental Protection Agency, Washington, D.C. (May 1991).

Brochure, ACS Industries, Inc., Houston, Tex. (1991), 4 pg.

Inplant SFC Brochure, Gulf Coast B10 Solve, Houston, Tex. (1991), 2 pg.

Solids From Liquids Filtration with LAKOS Separators, Claude Laval Corporation (1991), 1 page.

Heinis, et al., "Bodemsaneringstechnieken/1 Verwijdering van bodemverontreiniging," *PT/Civiele Techniek*, vol. 39, No. 1, Jan. 1984, pp. 7–15.

Van Gemert et al., "Reinigingsinstallatie voor vervuilde grond Extractie van broomverbindingen," *PT/Civiele Techniek*, vol. 40, No. 9, Sep. 1985, pp. 24–29.

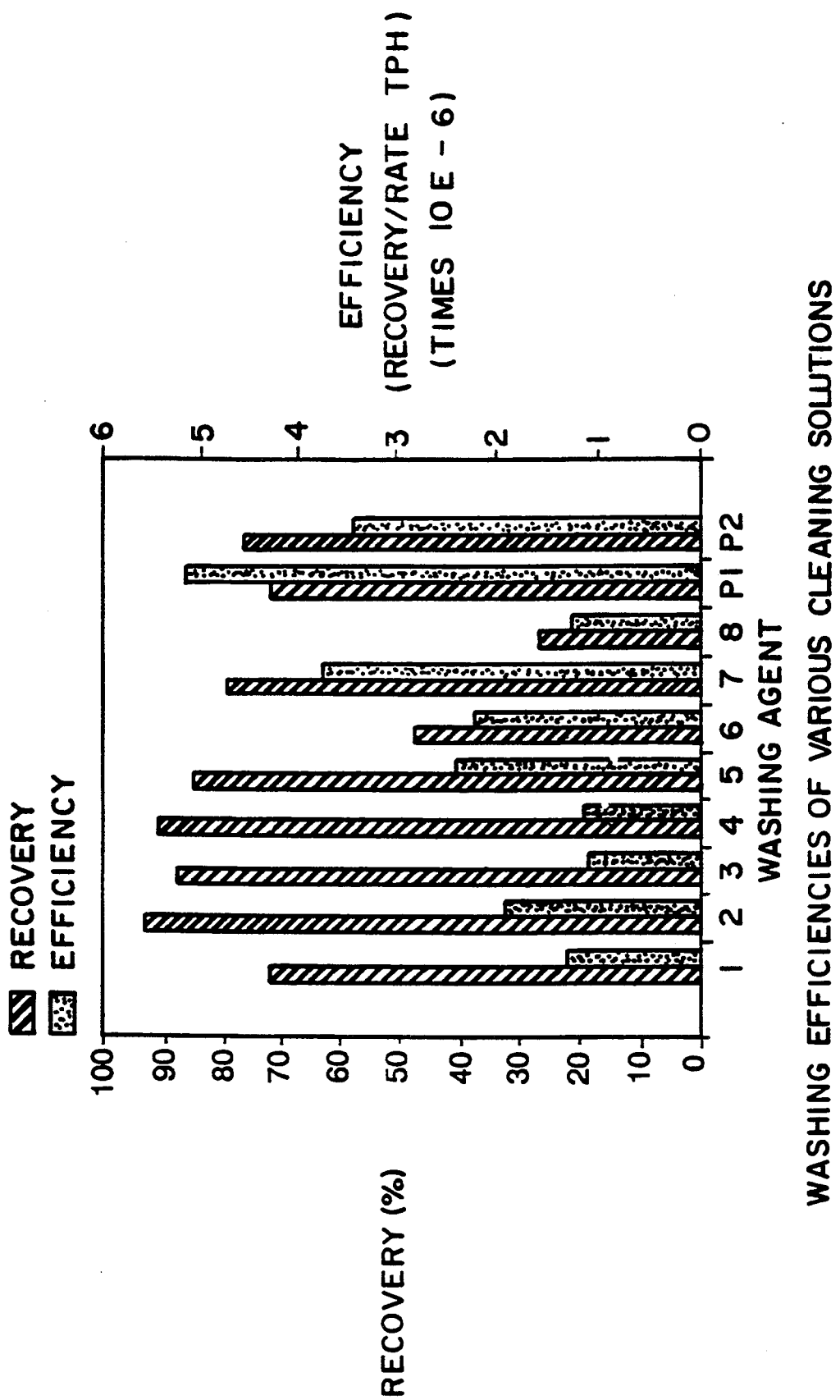

OIL, WATER AND SAND SEPARATOR

BACKGROUND OF THE INVENTION

1. Technical Field

The present invention relates generally to removing oil and water from sand, for example, to clean up oil spills, sludge pits, and oil well cuttings. The present invention more particularly relates to a continuous process for separating oil, water and sand that has a high through-put and does not involve incineration or discharge of cleaning agents. Specifically, the present invention relates to a continuous process that separates oil and water from sand and that recycles a detergent solution.

2. Background Art

Soil having a high concentration of oil has been cleaned by vaporization or incineration. These thermal processes, however, require an excessive amount of heat when the concentration of oil is low, especially when the concentration of oil is low compared to moisture content of the soil.

Soil washing systems have been devised, but in general they have had a relatively low-volume through-put and have involved excessive waste-water treatment, rendering the process uneconomical or impractical. Soil washing systems have also been limited at certain sites by the presence of a high concentration of silt or clay in the soil to be washed.

An overview of soil remediation techniques is found in the EPA handbook entitled "Remediation of Contaminated Sediments," EPA/625/6-91/028 (April 1991). On page 32 of this handbook, it is said seventeen full-scale commercial soil washing plants are currently in operation in Europe, and these plants are capable of handling from 10-130 tons of sediment per hour. The EPA has found that the effectiveness of the European soil washing plants may be limited at certain sites by the size of particles they rejected (particle classification is an early step in the European soil washing process.)

Further details regarding the background art in soil washing is shown on pages 9-3 to 9-7 of the EPA "Contaminated Sediments Seminar—Speaker Slide Copies," CERI-91-19, May 1991. As shown on page 9-6, an aqueous soil washing process includes soil preparation for removing oversize rejects, soil washing, rinsing, size separation to separate clean soil from sludge and contaminated fines, waste-water treatment of "blowdown" water, and recycling of some of the treated water. The operation of a cyclone for particle separation is shown on page 7-7.

SUMMARY OF THE INVENTION

The present invention separates oil, water and sand from soil by screening and separation of coarse particles, agitating the soil in a solution of detergent to promote emulsification of the oil, separating sand from the emulsion, separating the oil in the emulsion from the detergent solution, and recycling the detergent solution. This method is particularly effective when using a solution of non-ionic, biodegradable detergent.

Preferably the soil is wet screened to separate washed coarse particles or aggregate that is too large to pass through the washing system. The soil and detergent solution are agitated first at low speed to break up clumps of soil or clay, and to provide a homogenized mixture of the soil and the detergent solution, and then the homogenized mixture of the soil and the detergent is agitated at high speed to transfer the oil from the soil into an emulsion with the detergent solution. Preferably the mixture is agitated at high speed by a chopping auger or rotary impeller having a shaft that is flushed with a flow of clean fluid to prevent abrasive particles from the homogenized mixture from contacting a bearing upon which the shaft is mounted. The chopping auger or rotary impeller moves the mixture forward in the washing system as the mixture is agitated, which promotes continuous processing in the system.

Preferably the sand is separated from the emulsion by allowing the sand to settle at the bottom of a settling tank, lifting the sand from the bottom of the settling tank with a screw conveyor, and rinsing the sand lifted out of the settling tank with a series of sprinklers in the screw conveyor.

Preferably the oil in the emulsion is separated from the detergent solution in an oil-water separator which has a removable coalescing filter element, an inspection window for observation of an oil-water interface between the separated oil and detergent solution, an inspection window for observation of sediment in the filter, and a port for removal of the sediment from the filter. For reduced maintenance of the coalescing filter, the emulsion is passed through a hydrocyclone for removing fines before the emulsion is passed to the coalescing filter.

Depending on the oil and fine content of the soil, one or more additional washing stages may be required to achieve a specified limit of oil content of the washed sand. In a preferred arrangement having one additional washing stage, the sand removed from the settling tank is fed to the additional washing stage, where the sand is washed with secondary stage wash liquid. The sand is removed from the wash liquid, and the wash liquid is fed to a flocculation tank, where contaminated fines settle and are removed from the wash liquid. The secondary stage wash liquid is recycled from the flocculation tank. This arrangement is particularly advantageous when a hydrocyclone is used to separate fines from the emulsion. In this case, the fines are fed to the secondary wash stage, along with the sand removed from the settling tank.

BRIEF DESCRIPTION OF THE DRAWINGS

Other objects and advantages of the invention will become apparent upon reading the following detailed description and upon reference to the drawings in which:

FIG. 10 is a graph of washing efficiencies of various cleaning solutions;

Figure 1:
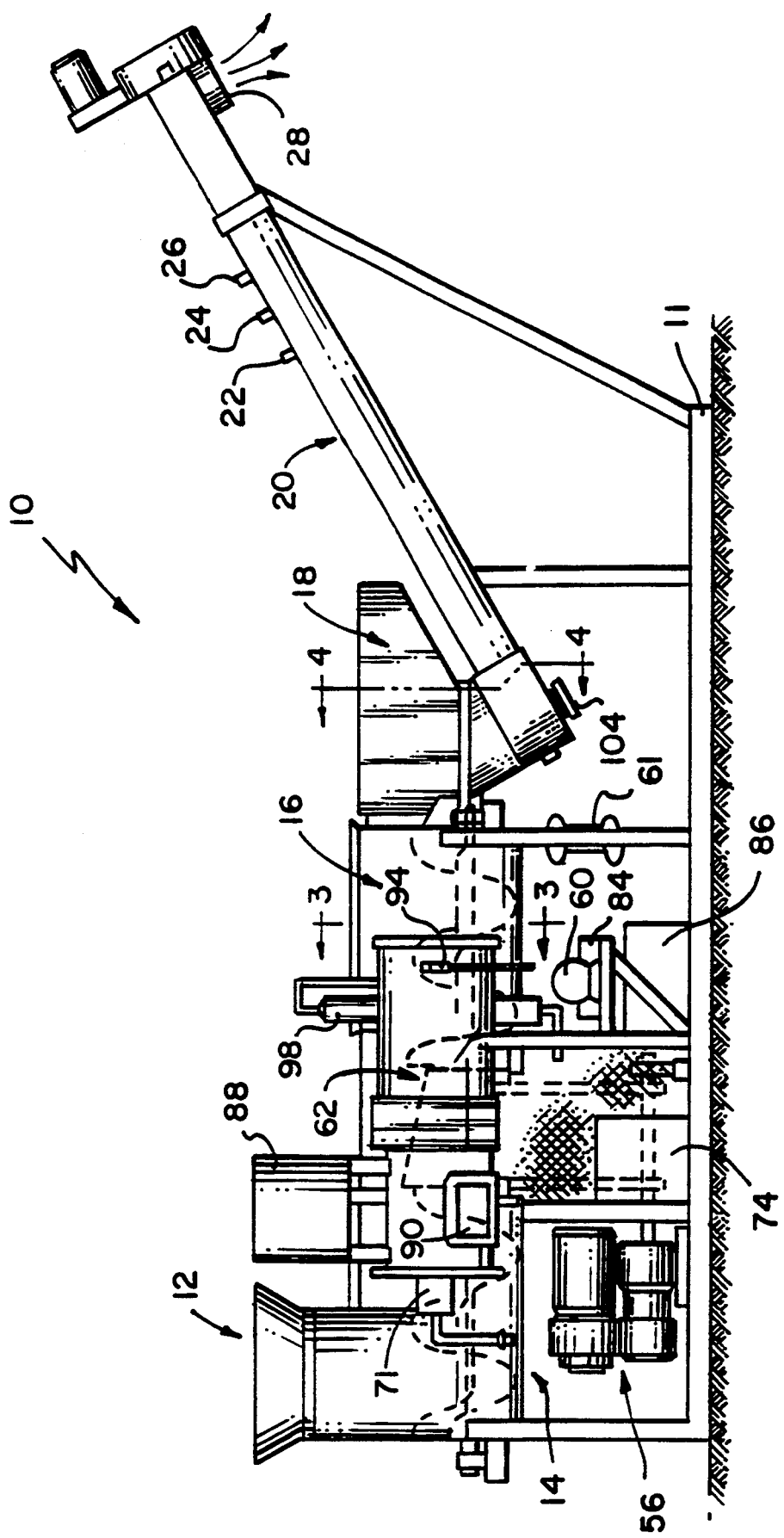
FIG. 1 is a plan view of a pilot plant employing the methods and apparatus of the present invention.

While the invention is susceptible to various modifications and alternative forms, specific embodiments thereof have been shown by way of example in the drawings and will herein be described in detail. It should be understood, however, that it is not intended to limit the invention to the particular form disclosed, but on the contrary, the intention is to cover all modifications, equivalents, and alternatives falling within the scope of the invention as defined by the appended claims.

DETAILED DESCRIPTION OF THE PREFERRED EMBODIMENTS

Turning now to the drawings, there is shown in FIG. 1 a plan view of a pilot plant 10 employing the methods and apparatus of the present invention for washing sandy soils contaminated with crude oil or refined petroleum products such as gasoline and diesel fuels. The pilot plant 10 is a trailer mountable mobile unit, and has a base 11 about 25 feet in length. The pilot plant has been used to wash contaminated sand at a rate of two tons per hour. It is estimated that a full scale unit would have a washing capacity of one hundred tons per hour.

As shown in FIG. 1, the pilot plant 10 has a chute 12 for receiving oily soil. The chute 12 is aligned over a low-speed mixing tank 14, where the soil is agitated at low speed in a detergent solution. The low speed of agitation breaks up clumps of soil and clay to provide a homogeneous mixture, and prevents splashing of the mixture out of the chute 12. In a production plant (not shown), wet screening would be employed to remove washed aggregate from the soil before the soil is fed into the chute 12. Some fine aggregate would pass through the wet screening, but this fine aggregate would pass through the washing system and be washed along with the sand in the soil.

The homogenized mixture overflows from the low-speed mixing tank 13 into a high-speed mixing tank 16. Here, vigorous agitation strips the oil from the surface of sand particles, forming an oil-detergent emulsion.

The emulsion and solids in the high-speed mixing tank 16 overflow into a settling tank 18, where the heavy sand grains quickly settle at the bottom and are removed by a screw elevator 20. In the screw elevator 20, the sand is rinsed by a series of sprinklers 22, 24 and 26. Finally, the clean sand is dumped from an exit port 28 at the top of the screw elevator 20.

Figure 2:
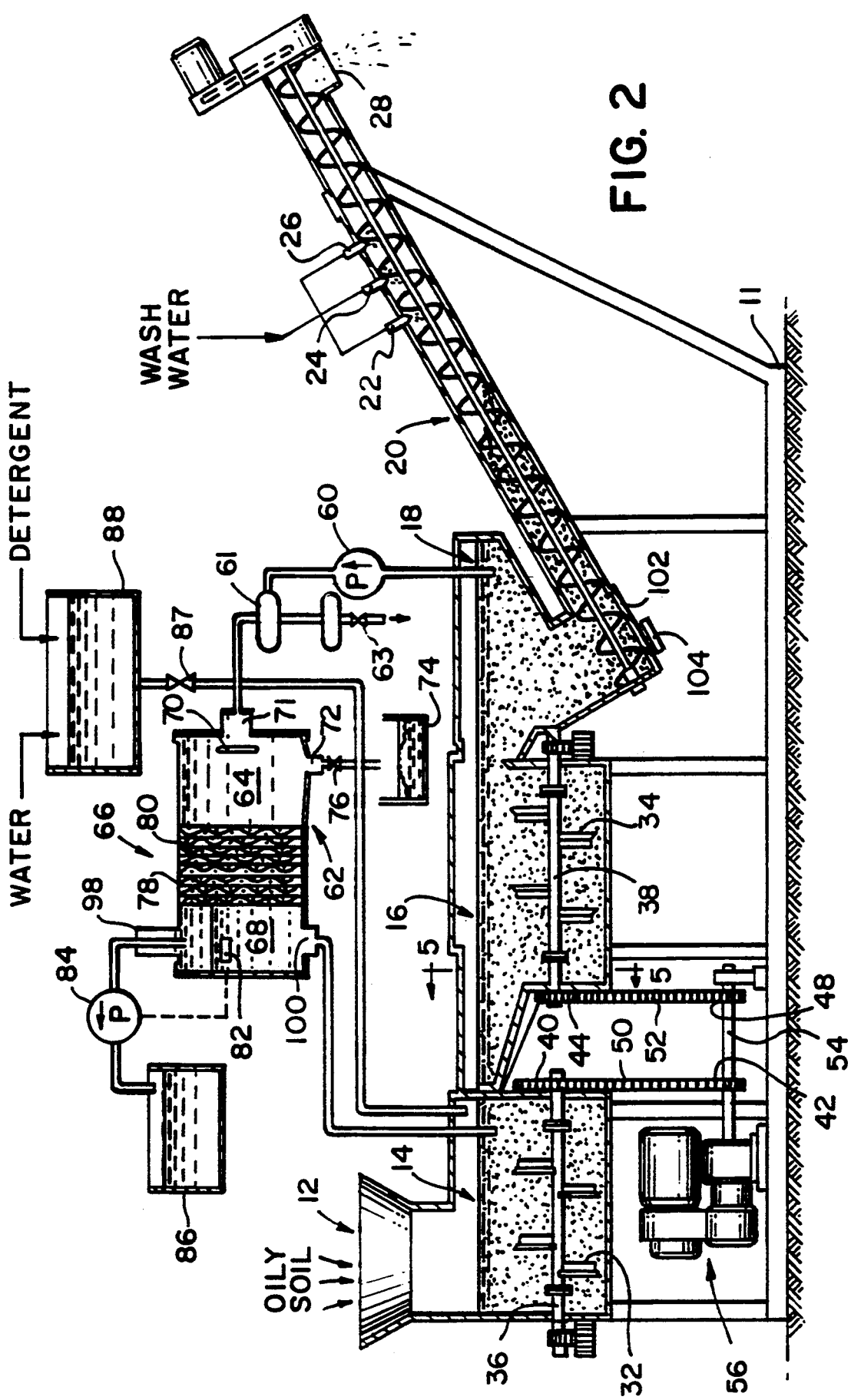
FIG. 2 is a schematic diagram showing the separation of sand, oil, water, and silt from oily soil in the pilot plant of FIG. 1.

Turning now to FIG. 2, the flows of material through the pilot plant 10 are more clearly shown. It should be noted that FIG. 2 shows the tanks 14, 16, 18 and the screw elevator 20 in longitudinal cross-section, and shows additional components in a schematic, flow-diagram representation. FIG. 1 should be referenced to find the physical placement and orientation of these additional components.

Figure 5:
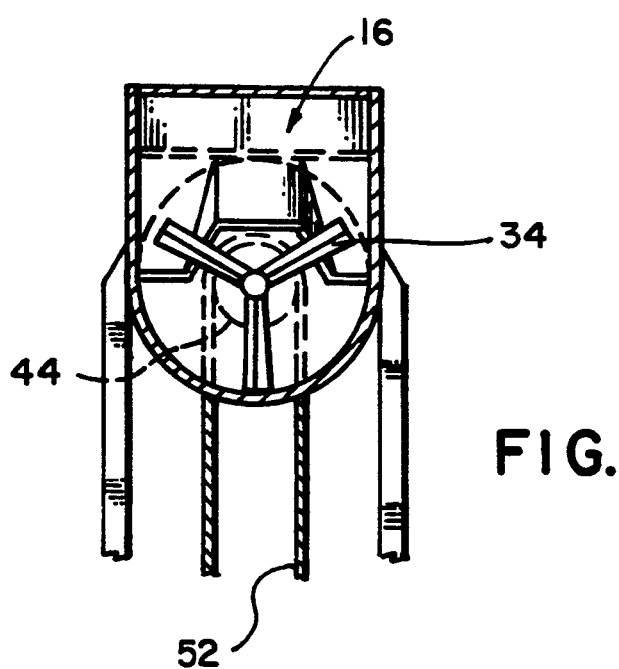
FIG. 5 is a section view of the pilot plant of FIG. 1 along lines 5—5 of FIG. 2, showing a tank in which a soil and detergent mixture is agitated at high speed by a rotary impeller.

As most clearly seen in FIG. 2, each of the mixing tanks 14, 16 has a respective mixing auger 32, 34 mounted on a respective shaft 36, 38. Each mixing auger 32, 34 has a series of paddles or blades, pitched at about 17 degrees, which are spaced longitudinally as shown in FIG. 2, and which are also spaced at 120 degree intervals radially, as shown in FIG. 5. As shown in FIG. 2, The shafts 36, 38 are connected by sprockets 40, 42, 46, 48 and chains 50, 52 to a common drive shaft 54 of an electric motor drive unit 56, which has a variable-speed cone transmission. The variable-speed cone trasmission, for example, is a SEW Eurodrive, Inc., model #R92VU50Y180M4, 78 to 339 RPM, Variable Ratio 10.9:1 Max Reduction, Torque 3740@78 RPM, supplied by Allied Belting & Transmission, 2554 Erring Blvd., Dallas, Tex. 75207. The sprockets 40, 42, 46 and 48 are sized so that the mixing auger 34 in the high-speed mixing tank 16 is rotated at a speed twice as fast as the mixing auger 32 in the low-speed mixing tank 14. During tests of the pilot plant, as further described below, the mixing auger 32 was rotated at 60 revolutions per minute, and the mixing auger 34 was rotated at 120 revolutions per minute.

In order to recycle the detergent solution, the sand-free oil-detergent emulsion at the far-end top of the settling tank 18 is pumped by a diaphragm pump 60 into a hydrocyclone 61, which removes fines from the emulsion. The fines collect at the bottom of the hydrocyclone 61 and are periodically removed by opening a valve 63. The emulsion flows from the hydrocyclone 61 to an oil-water separator 62. The hydrocyclone 61, for example, is a LAKOS separator sold by Eggelhof Incorporated, 10500 Metric Dr., Suite 112, Dallas, Tex. 75243. The diaphragm pump 60 is used instead of a centrifugal pump to avoid formation of very fine droplets in the emulsion, which would cause the emulsion to be very stable and hinder separation of the oil from the emulsion. Preferably the oil-water separator 62 has a coalescing filter.

As shown in FIG. 2, the oil-water separator 62 has a settling section 64 at an inlet end, an intermediate area containing a removable section 66 of coalescing filter medium, and an oil-water boundary section 68 at an outlet end. The settling section 64 has a baffle 70 to diffuse the inflow of oil-detergent emulsion, and the velocity of the inflow is further reduced by an expanded-diameter inlet pipe 71. The settling section 64 also has a lower outlet port 72 from which silt can be dumped into a silt tank 74 by opening a drain valve 76. The coalescing filter medium 66 preferably includes two rectangular sections 78, 80, each 12" wide by 24" long and 8" thick. Each rectangular section is a removable rectangular mesh pad made of stainless steel wire mesh and $\frac{1}{2}$ inch thick knitted Polypropylene multifilament pad supported between top and bottom supports of $\frac{1}{4}"\times 1"$ flat bar of type 305 stainless steel. The mesh pads are sold by ACS Industries, Inc., 14208 Industry Road, Houston, Tex. 77063, for use in coalescing filters.

In the oil-water boundary section 68, a float switch 82 senses the level of the oil-water boundary, and turns on a centrifugal pump 84 when the level is lower than about one-third of the height of the filter 62. The centrifugal pump sucks the oil from the top of the oil-water separator and discharges the oil into oil tank 86.

Although most of the detergent is recycled, some detergent is absorbed into the silt discharged into the silt tank 74 and the fines removed by the hydrocyclone 61, some detergent is absorbed into the oil discharged into the oil tank 86, and some detergent is discharged with the rinsed sand. To make up for this loss of detergent, a valve 87 is opened to supply make-up detergent solution from a 50-gallon tank 88 to the low-speed mixing tank 14.

One advantage of recycling of the detergent solution is the saving of the cost of detergent. Another advantage is that waste water treatment is avoided. As should be apparent from the flow diagram of FIG. 2, waste water is avoided entirely by only using an amount of wash water to the sprinklers 22, 24 and 28 that balances the amount of moisture retained in the sand, discharged into the silt tank, discharged with the fines, and absorbed into the oil discharged into the oil tank. In a production plant, the flow of wash water could be regulated automatically by sensing the deviation of the liquid level in the tanks 14, 16, and 18 from a predetermined desired level by using a level sensor, and adjusting the flow of wash water accordingly by operating a servo-controlled valve, in the fashion of a conventional feedback control loop.

Turning for a moment to FIG. 1, it is seen that the oil-water separator 62 has an inspection window 90 for observation of the build-up of silt, which is periodically dumped into the silt tank 74.

Figure 3:
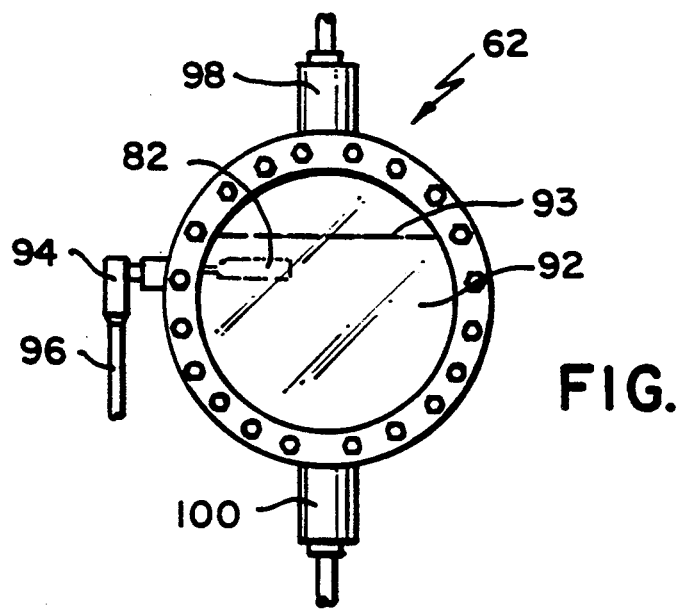
FIG. 3 is an end view along lines 3—3 of FIG. 1 of an oil-water separator used in the pilot plant of FIG. 1.

Turning now to FIG. 3, there are shown further details of the oil-water separator 62. The outlet end of the oil-water separator has an inspection window 92 for observation of the oil-water boundary 93. The level of this oil-water boundary is sensed by the float 82 which is coupled to a switch housing 94 which is in turn coupled by an electrical cable 968 to the centrifugal oil pump (84 in FIGS. 1 and 2). The oil is drawn from an upper outlet pipe 98, and the detergent solution is withdrawn from a lower outlet pipe 100.

Figure 4:
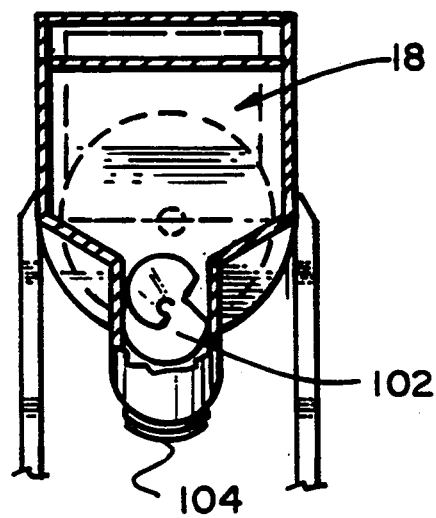
FIG. 4 is a cross-section of the pilot plant of FIG. 1 along lines 4—4 of FIG. 1 showing a settling tank where sand is separated from an oil-detergent emulsion.

Turning now to FIG. 4, there is shown a cross-section of the settling tank 18. The lower portion of the settling tank 18 is adapted to surround the lower portion of the screw 102 of the screw elevator (20 in FIGS. 1 and 2). Moreover, the lower portion of the settling tank 18 is provided with an access port 104 for cleaning or removing any debris which might clog the screw elevator 20.

Turning now to FIG. 5, there is shown a cross-section of the high-speed mixing tank 16, including an end view of the paddle mixing auger 34.

Figure 6:
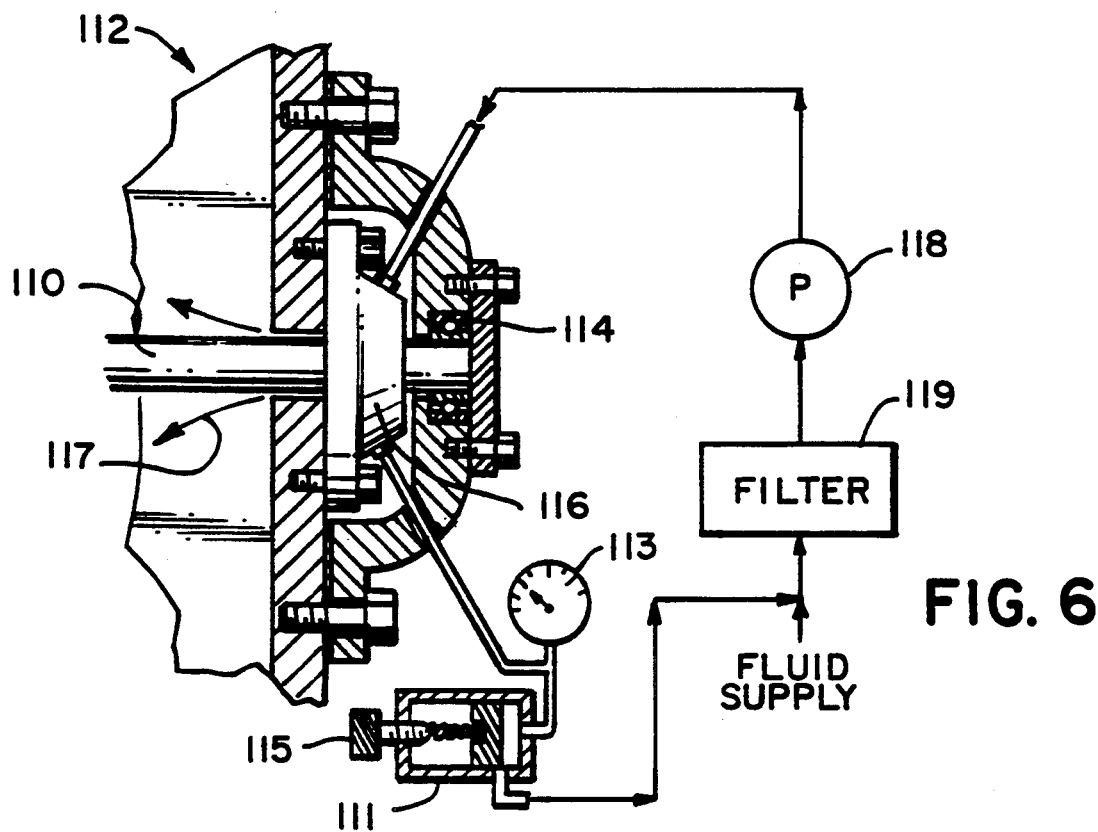
FIG. 6 is a schematic view, in partial section, of an arrangement for journaling the shaft of an impeller for agitating the soil-detergent solution in the pilot plant of FIG. 1.
Figure 7:
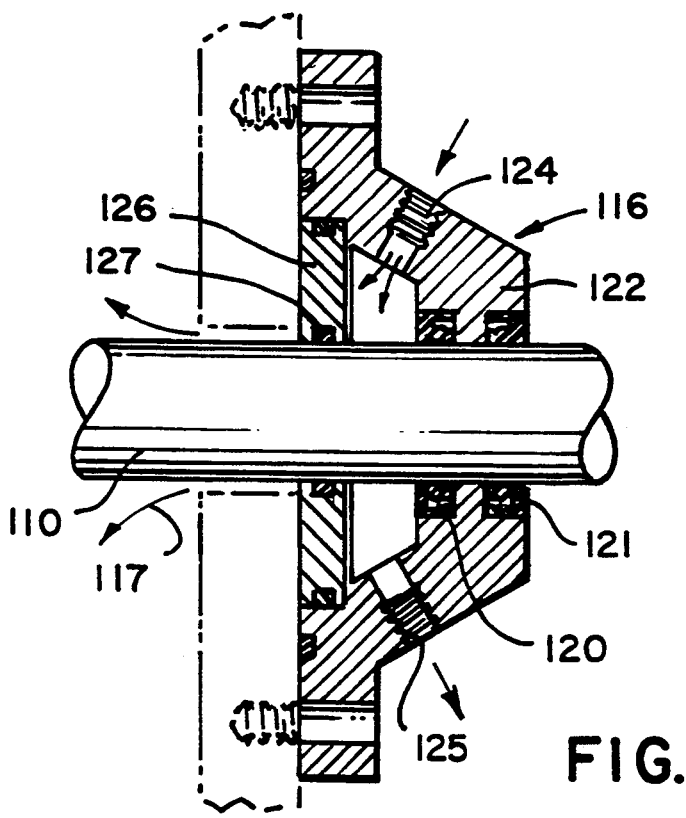
FIG. 7 is a cross-sectional view of a seal arrangement for sealing the shaft of FIG. 6 and flushing the shaft with a flow of clean fluid to prevent abrasive particles from contacting a bearing upon which the shaft is mounted.

Turning now to FIG. 6, there is shown a cross-sectional view of an arrangement for mounting an impeller shaft 110 in a mixing tank 112 so as to prevent abrasive particles in the mixing tank from reaching a bearing 114 which journals the shaft 110 to the tank 112. During the operation of the pilot plant (10 of FIG. 1), it was found that abrasive particles from the soil would very quickly destroy rubber ring seals (such as the ring seal shown in FIG. 8) and the steel shafts. Therefore, in a commercial soil washing plant, it is desirable to use the arrangement shown in FIG. 6. In this case, a seal assembly 116, further described below with respect to FIG. 7, is used in lieu of a conventional rubber ring seal. The seal assembly 116 flushes the shaft 110 with clean fluid. The seal assembly 116 receives the clean fluid from a pump 118, and the clean fluid is obtained by passing fluid through a filter 119. The clean fluid, for example, is water or air. To prevent any build-up of contamination in the seal assembly 166, a positive fluid pressure is maintained in the seal assembly with respect to the tank 112, and a continuous flow of clean fluid is circulated through the seal assembly. For this purpose fluid exits from the bottom of the seal assembly 116 and recirculates through a flow regulating valve 111 back to the pump 118 and filter 119. The pressure in the seal assembly 116 is indicated by a pressure gage 113, and the flow regulating value 111 has a control 115 that is adjusted to give a reading of from 2 to 5 psig pressure in the seal assembly.

As further shown in FIG. 7, the seal assembly 116 is constructed so as to flush the shaft 110 with a flow 117 of the clean fluid and thereby prevent abrasive particles from the mixture in the mixing tank from contacting the bearing (114 in FIG. 6). The flow of clean fluid prevents any abrasive particles from contacting conventional rubber ring seals 120 and 121 so that abrasive fluid does not flow over the surface of the shaft leading to the bearings (114 in FIG. 6). As shown in FIG. 7, the assembly 116 includes a metal housing 116 to which the rubber ring seals 120 and 121 are mounted. The clean fluid enters a port 124 and exits a port 125 in the housing 122. To reduce the amount of fluid required to flush the shaft 110, the housing 116 receives a metal ring 126 which retains a plastic ring 127 about the shaft 110. The plastic ring 127, for example, is a teflon washer. During operation, the inside diameter of the plastic ring 127 is eroded by the abrasive particles until a clearance gap between the plastic ring 127 and the shaft 110 is obtained that permits only so much of the clean fluid to pass as is necessary to prevent the abrasive particles from reaching the rubber sealing rings 120, 121.

Figure 8:
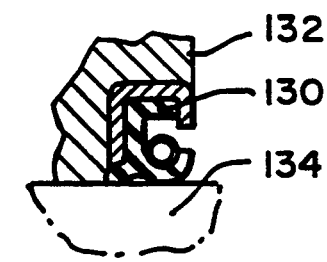
FIG. 8 is a cross-section of a portion of a preferred rubber ring seal used in the shaft sealing arrangement of FIG. 7.

Turning now to FIG. 8, there is shown the construction of the kind of conventional rubber sealing ring 130 best suited for use in the assembly 116 of FIG. 7. The conventional rubber sealing ring 130 is shown mounted in a housing 132 and sealing a shaft 134. This kind of seal, for example, is sold by Transcom, Inc., P. 0. Box 1168, Burnsville, Minn. 55337.

Figure 9A:
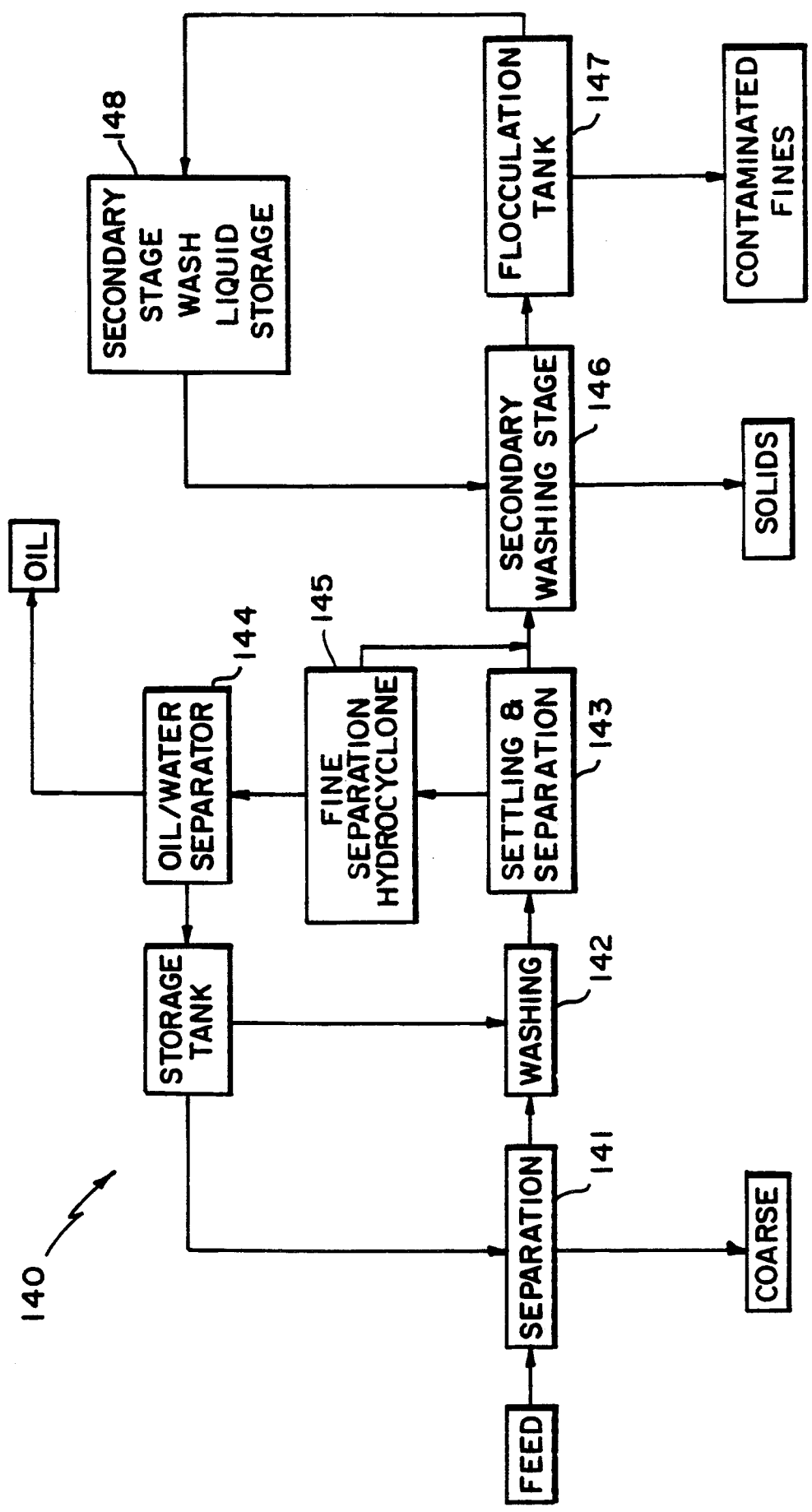
FIG. 9A is a block diagram of a two-stage soil washing system which could use the pilot plant of FIG. 1 for the first washing stage.

Turning now to FIG. 9A, there is shown a block diagram of a proposed two-stage soil washing system 140, that is based upon experienced gained during operation of the pilot plant of FIG. 1. The pilot plant of FIG. 1, for example, performs operations corresponding to the separation 141, washing 142, settling & separation 143, fine separation 145, and oil/water separator 144. It was found that the fines from the hydrocyclone 61 has adsorbent properties. Therefore, as illustrated in FIG. 9A, the fines from the hydrocyclone (145 in FIG. 9A) could be passed along with solids to a secondary washing stage 146 where the fines could be agitated in secondary stage wash liquid to further clean the sand. After settling and removal of the sand, the fines and wash liquid would be passed to a flocculation tank 147, where the contaminated fines would bind with a flocculent, settle and be removed. The flocculent, for example, could be one of the following: CYSLOC 500 brand of anionic polyacrylamide, or MAGNAFLOC 1596C brand of cationic polyacrylamide, sold by American Cyanamid Co. of Wayne, N.J. 07470; or J-FLOC 912 brand of cationic flocculent, sold by Exxon Chemicals Co. and Callaway Chemical Co., 6601 Canal St./ 1136 Chumar Street, Columbus, Ga. 31907

The secondary stage wash liquid would be fed to a storage tank 148 for recycling to the secondary washing stage 146.

Depending on the type of contamination and the desired final level of contamination, additional washing stages could be used. These additional washing stages could each include a centrifugal pump that functions as an agitator as well as a pump, and a high-efficiency hydrocyclone for sand and fines separation. The washing operation would involve the transfer of contamination to the washing liquid. A preferred high-efficiency hydrocyclone, for example, is a Model 240 sold by Quality Solids Separation Company, 4500 Pinemont, Houston, Tex. 77290-0776.

Figure 9B:
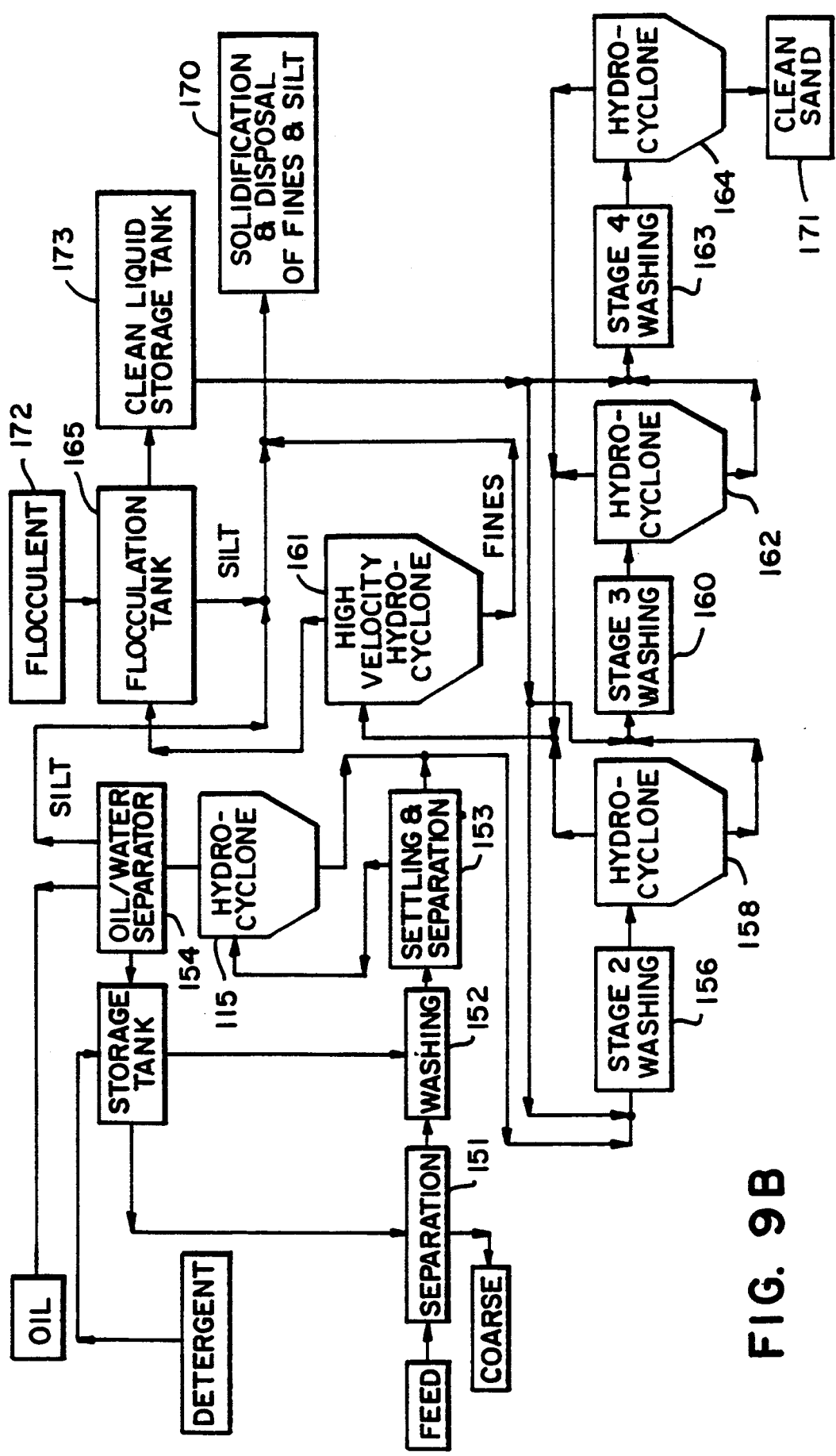
FIG. 9B is a block diagram of a four-stage soil washing system.

A proposed four-stage soil washing system 150 is shown in FIG. 9B. The first stage includes separation 151, washing 152, settling and separation 153, an oil/water separator 154, and a hydrocyclone 155, as described above with respect to FIG. 9A. Solids from the settling and separation 153 are combined with fines from the hydrocyclone 155 and fed to a second-stage washing unit 156, which is, for example, a centrifugal pump.

In the second-stage washing unit 156, the solids and fines are mixed with clean washing liquid from a storage tank 173. Initially this clean washing liquid would simply be water, but after some time it would include a certain amount of detergent having been rinsed from the solids and fines from the first stage. The mixture from the second stage washing unit 156 is fed to a hydrocyclone 158, and a down-flow of solids from the hydrocyclone 158 is fed to a third stage washing unit 160. The third stage washing unit 160 is, for example, also a centrifugal pump, which mixes the solids with clean washing liquid from the clean liquid storage tank 173. The mixture from the third stage washing unit 160 is fed to another hydrocyclone 162, and a down-flow of solids from this hydrocyclone 162 is fed with clean washing liquid from the tank 173 to a fourth stage washing unit 163. This fourth stage washing unit, for example, is also a centrifugal pump. The mixture from the fourth stage washing unit is fed to still another hydrocyclone 164. The solids in the down-flow from this hydrocyclone 164 consists primarily of clean sand 171.

The up-flow from the hydrocyclones 158, 162, and 164 includes silt, fines, and used washing liquid. A high-velocity hydrocyclone 161 could be used to remove most of the fines. A preferred high-velocity hydrocyclone is the LAKOS sold by Eggelhof Inc., 10500 Metric Dr., Suite 112, Dallas, Tex. 75243. The silt and used washing liquid in the overflow of the high-velocity hydrocyclone 161 is fed to a flocculation tank 165, where a flocculent 172 is added that binds with the silt and any fines, to cause silt and any fines to settle to the bottom of the flocculation tank. Overflow from the flocculation tank 165 is fed to the clean liquid storage tank 173.

Silt from the oil/water separator 154, fines from the hydrocyclone 161, and sediment from the flocculation tank 165 are solidified and disposed of in step 170, for example, by mixing the silt and fines with portland cement and crushed limestone, as described in U.S. Pat. Nos. 5,007,590 and 5,028,010, or by thermal evaporation.

The industrial applicability of the present invention has been demonstrated by bench scale and pilot plant tests, as illustrated in FIGS. 10 to 13. The bench scale tests indicate that the four stage system 150 of FIG. 9B should be sufficient for washing oily soil from oil spills to below a 100 ppm total hydrocarbon content. The pilot plant tests, however, indicate that only a two or three stage system might be sufficient. In such a three stage system, the washing unit 162 of FIG. 9B would be eliminated. These bench scale and pilot plant tests involved a variety of cleaning agent solutions from a number of suppliers, as identified in the following Tables I and II:

TABLE I

| Detergent (% Aqueous Solution By Volume) | Agent # |
| --- | --- |
|  | 1 |
| BioSolve 8% | 2 |
| Fleet 8% | 3 |
| Bulldozer 8% | 4 |
| Siallon 8% | 5 |
| BioSolve 8% & AO-14-2 | 6 |
| BioSolve 8% & Q-14-2 | 7 |
| ET-5 .5% | 8 |
| AO-14-2 .25% | 9 |
| AO-14-2 2% | 9A |
| A-14-2 .25% | 10 |
| ET-5 + AO-14-2 | 11 |
| ET-5 + Q-14-2 | 12 |
| PILOT TEST 1 - BioSolve 4% | P1 |
| PILOT TEST 2 - BioSolve 8% | P2 |

TABLE II

| CLEANING AGENT SUPPLIERS | |
| --- | --- |
| BioSolve | METRA CHEMICAL CORPORATION 270 Littleton Road Unit 12, P.O. Box 427 Westford, MA 01886-0427 800/225-3909 |
| Siallon CA-8 | SIALLON CORPORATION 112121 Wilshire Blvd., Suite 1000 Los Angeles, CA 90025 213/447-5522 |
| Fleet | ARROW MAGNOLIA 2646 Rodney Dallas, TX 75229 Tammy Celcer - 214/247-7111 |
| AO-14-2 Q-14-2 | EXXON CHEMICAL COMPANY Application Chemicals Division |
| ET-5 | Tomah Products Milton, WI 55563-0508 608/868-6811 |
| Bulldozer | ARROW MAGNOLIA 2646 Rodney Dallas, TX 75229 Tammy Celcer - 214/247-7111 |

The above cleaning agents were selected on the basis of their compatibility with the environment and biodegradability, ease of demulsification, cost, and cleaning efficiency.

Bench tests were performed on two different soil samples obtained at two different geographical sites. The first site had a major diesel fuel leak and its total petroleum hydrocarbon (TPH) content ranged from one to sixteen percent; this soil sample is designated as "FIELD 1" in FIG. 16. The second site was contaminated with one to six percent of crude oil; this soil sample is designated as "FIELD 2" in FIG. 16. The hydrocarbon contents of these samples were determined in accordance with "Test Methods for Evaluating Solid Waste," SWS-846, Office of Solid Waste and Emergency Response, US EPA 3rd Edition (November 1989) plus updates. Both samples were also analyzed for their respective particle size distribution, in accordance with ASTM D452-85, "Standard Method for Sieve Analysis of nongranular mineral surfacing for Asphalt Roofing Products," 1990 Annual Book of ASTM Standards, Vol. 04.08, "Soil and Rock; Dimension Stone; Geosynthetics," ASTM, 1916 Race Street, Philadelphia, Pa. 19103-1187, pp. 109–110 (1990).

Bench test washings were performed with the help of a mechanical mixer, in accordance with ASTM standard D3551-88, "Standard Method for Laboratory Preparation of Soil-Lime Mixtures Using a Mechanical Mixer," 1990 Annual Book of ASTM Standards, Volume 04.08, "Soil and Rock; Dimension Stone; Geosynthetics," ASTM, 1916 Race Street, Philadelphia, Pa. 19103-1187, pp. 432-3 (1990). A measured quantity of soil sample was placed in the bowl of the mixer. An appropriate amount of washing liquid was added and the mixer was turned on for fifteen minutes. At the end of the mixing cycle, the sample was allowed to sit for two minutes, the liquid was then decanted, and a small sample of the solid was removed for analysis. Multiple stage washings were carried out using fresh liquid at each stage.

Pilot plant tests were performed on a mixture of commercial diesel fuel and sand having a particle size distribution similar to the particle size distributions of the two soil samples. The pilot plant washings used a 4% and 8% aqueous solution of BIO SOLVE (Trademark) non-ionic biodegradable detergent, which is made by METRA Chemical Corp., 270 Littleton Road, Unit 12, P. O. Box 427, Westford, Mass. 01886-0427, listed under Section 300.86 of the NCP Product Schedule, and sold by Gulf Coast Bio Solve, 16155 Park Row, Suite 140, Houston, Tex. 77084. The pilot plant tests are designated as using agents P1-1 and P2-1. In general, the tests indicate that a 4% aqueous solution of BIO SOLVE (Trademark) non-ionic detergent would be the preferred detergent for a commercial-scale soil washing plant.

The bench test washings of the "FIELD 1" soil and the pilot plant tests resulted in the single stage soil cleaning efficiencies reported in TABLE III below and shown graphically in FIG. 10:

TABLE III

WASHING EFFICIENCIES OF VARIOUS CLEANING AGENT SOLUTIONS

| Agent # | | TPH (ppm) | | | |
|---|---|---|---|---|---|
| % | Type | Raw | Washed | Recovery | Efficiency |
| 1 | Nonionic | 55200 | 15800 | 71.4% | 1.3E-05 |
| 2 | Nonionic | 48100 | 3550 | 92.6% | 1.9E-05 |
| 3 | Anionic | 78900 | 10100 | 87.3% | 1.1E-05 |
| 4 | Anionic | 79800 | 7460 | 90.7% | 1.1E-05 |
| 5 | — | 35200 | 5220 | 85.2% | 2.4E-05 |
| 6 | #2+Add | 21000 | 11100 | 47.1% | 2.2E-05 |
| 7 | #2+Add | 21000 | 4400 | 79.0% | 3.8E-05 |
| 8 | Nonionic | 21000 | 15500 | 26.2% | 1.2E-05 |
| P1 | Nonionic | 13800 | 4000 | 71.0% | 5.1E-05 |
| P2 | Nonionic | 22100 | 5350 | 75.8% | 3.4E-05 |

Figure 11:
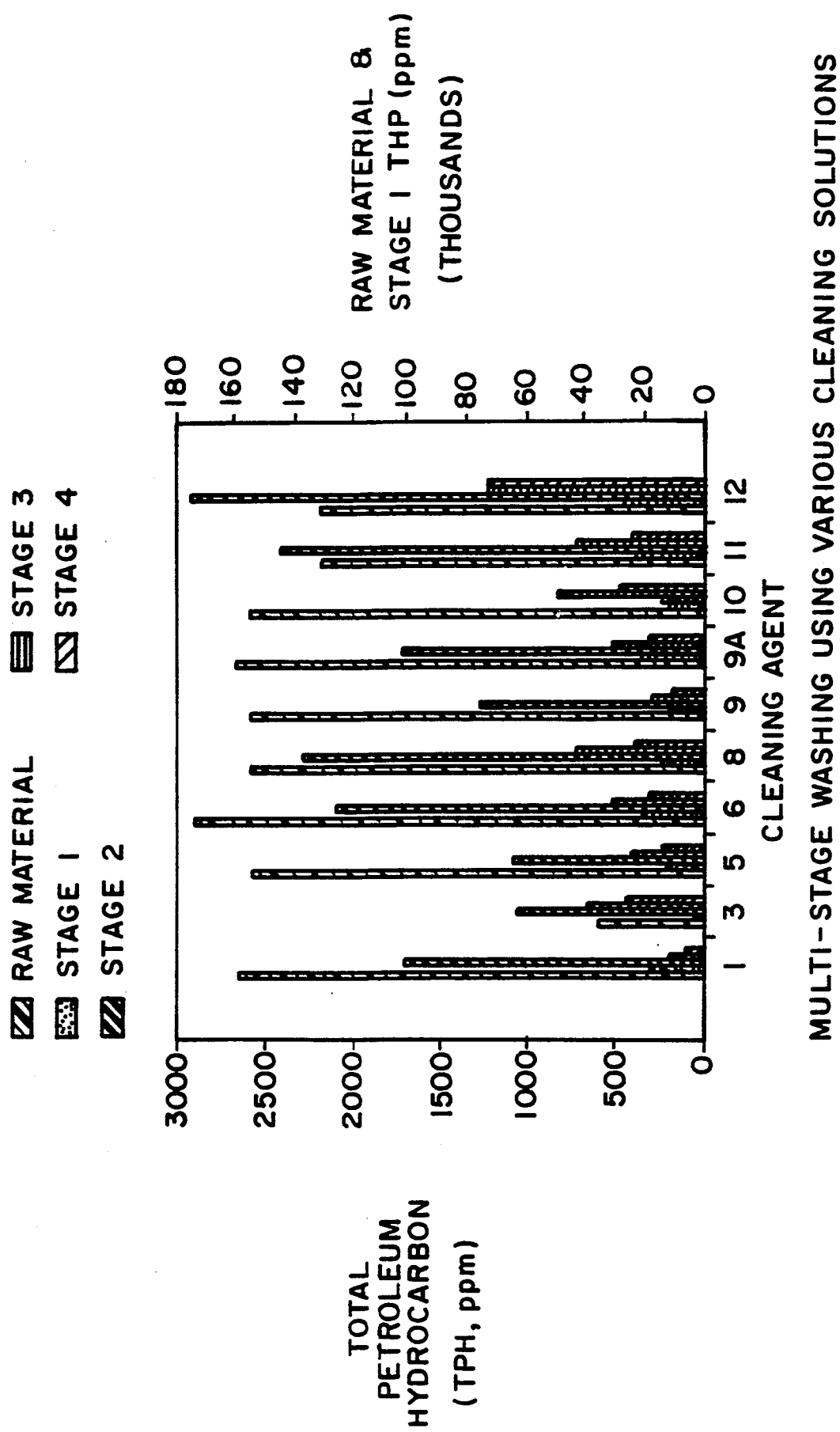
FIG. 11 is a graph showing the performance of multistage washing using various cleaning solutions.

The multiple bench test washings of the "FIELD 1" soil resulted in the reductions in total petroleum hydrocarbon reported in TABLE IV below and shown graphically in FIG. 11.

TABLE IV

RESULTS OF THE MULTI-STAGE WASHING STUDY

| Agent # | Type | TPH (ppm) | | | | |
|---|---|---|---|---|---|---|
| | | Raw | Stage1 | Stage2 | Stage3 | Stage4 |
| 1 | Non-ionic | 159000 | 17600 | 1700 | 200 | 100 |
| 2 | Anionic | 35500 | 2540 | 1060 | 650 | 430 |
| 5 | — | 154000 | 11600 | 1070 | 400 | 220 |
| 6 | #1+Add | 173000 | 19600 | 2100 | 500 | 300 |
| 6 | #1+Add | 154000 | 13300 | 2290 | 710 | 380 |
| 9 | Nonionic | 154000 | 9950 | 1250 | 280 | 170 |
| 9A | Nonionic | 159000 | 19700 | 1700 | 500 | 300 |
| 10 | Cationic | 154000 | 10300 | 218 | 801 | 461 |
| 11 | Nonionic | 130000 | 21700 | 2400 | 700 | 400 |
| 12 | Mix | 130000 | 25400 | 2900 | 1200 | 1200 |

The bench test washings of the "FIELD 1" soil suggest that the non-ionic cleaning agents are the most effective. While the best single stage efficiency was displayed by the agent No. 5, agent No. 1 was much more effective in a multistage operation. The reason for this is not clearly understood at this time but it is suspected that the emulsion formed by the agent No. 5 is more stable, and therefore, a final separation may be difficult. A similar behavior is seen in the cases of agent Nos. 6 and 7 which are combinations of agent No. 1 with additives. This observation, along with the overriding factors of cost and availability, led to the selection of agent No. 1 for the pilot tests.

The high cleaning efficiency of the pilot tests (reported as agents P1-1 and P2-1) is attributed to much better agitation and shear force provided by the pilot plant mixing stage. The slight decrease in efficiency for the second pilot test may be the result of lower agitation speed used for this test, although this hypothesis has not been confirmed.

Figure 12:
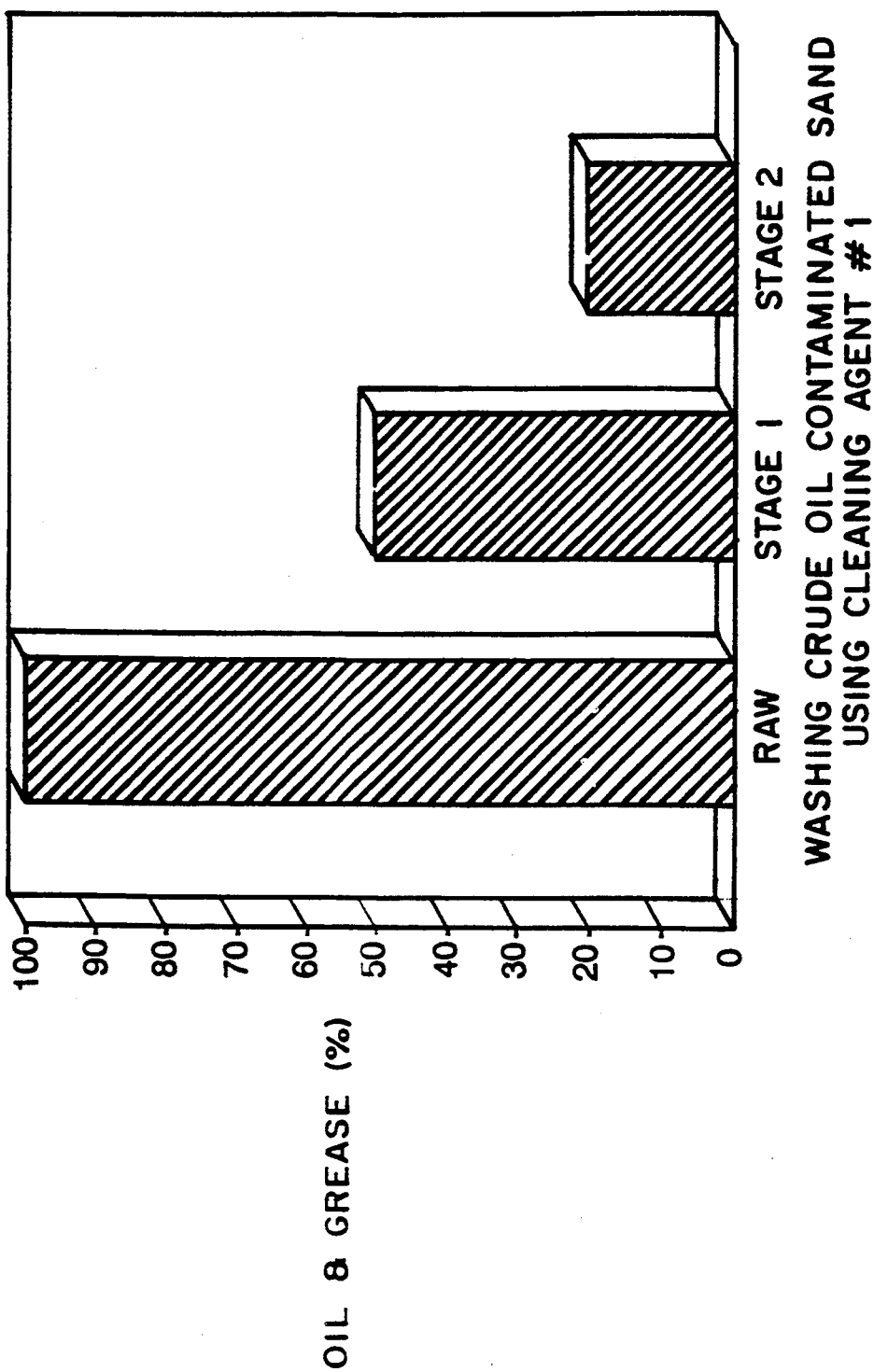
FIG. 12 is a graph showing the reduction in hydrocarbon content obtained by washing crude oil contaminated sand using a preferred cleaning agent.

The crude oil contaminated soil sample designated as "FIELD 2" was also treated with the cleaning agent No. 1 in bench tests. The results are shown in FIG. 12. These results should be compared to the four stage washing result for agent No. 1 in TABLE IV and FIG. 11, which indicate that crude oil contamination can be very successfully reduced to near or below detection level which was 100 ppm in this case. The pilot data indicate that a four stage pilot plant washing process should be even more successful.

Figure 13:
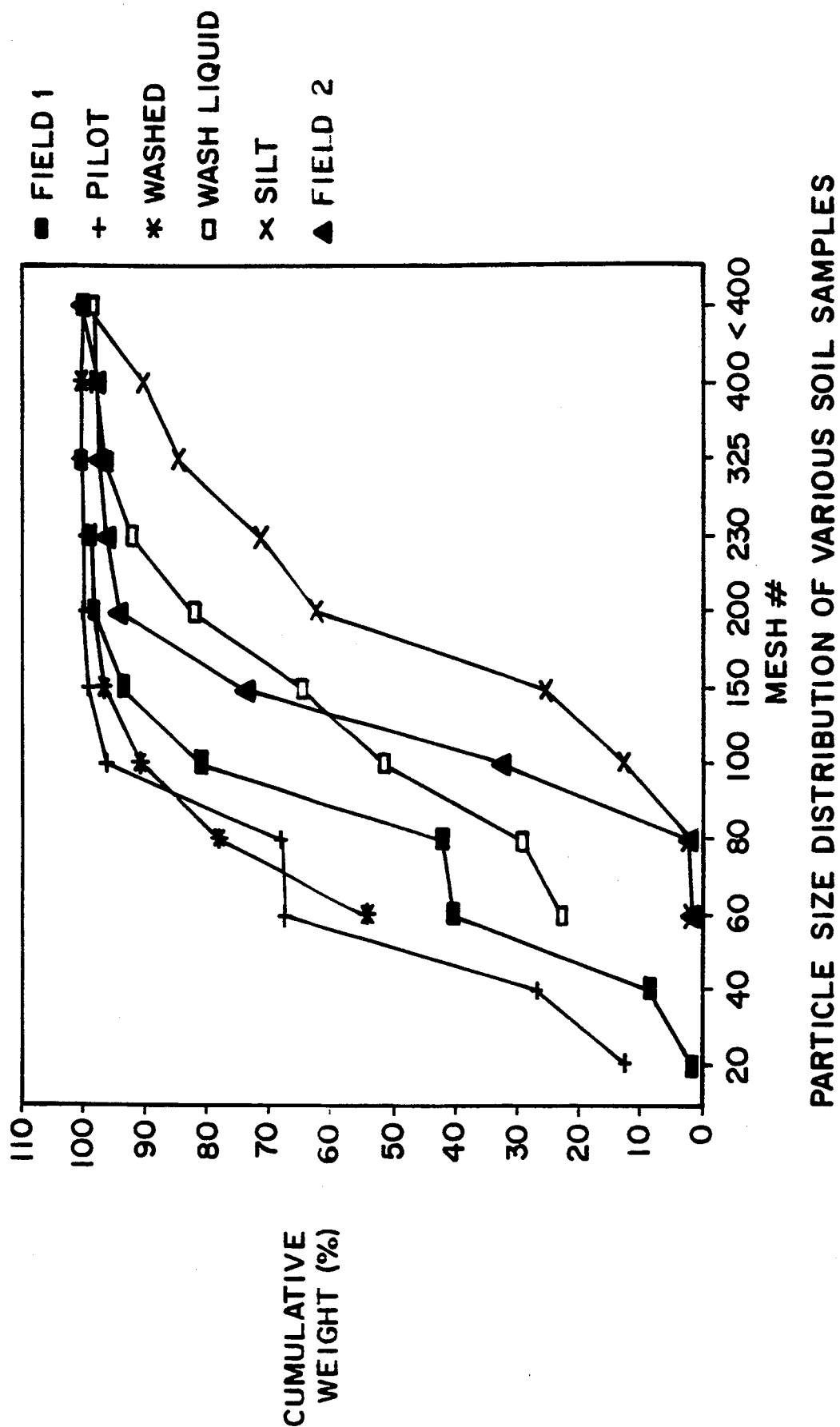
FIG. 13 is a graph of the particle size distribution of various soil samples.

The particle size distribution of different soil samples is shown in FIG. 13. The silt level of the washed sand is almost the same as the two field soil samples, although it has a little higher grain size overall. Nevertheless, it seems to be a very good approximation of the field material. The washed sand has a particle size distribution very similar to the starting material indicating a good separation efficiency of the solid/liquid separator (i.e., the settling tank 18 and screw elevator 20 in FIG. 1) employed in the pilot plant.

FIG. 13 also shows the efficiency of a hydrocyclone when the hydrocyclone was placed in the fluid stream after the diaphragm pump (60 in FIG. 2) and before the oil/water separator (62 in FIG. 2) in the pilot plant. In particular, the "WASH LIQ" in the key of FIG. 13 denotes liquid collected upstream of the hydrocyclone, and the "SILT" in the key of FIG. 13 denotes silt collected from inside of the oil-water separator (62 in FIG. 2). Therefore the change in the particle size distributions for "WASH LIQ" and "SILT" are due to the effect of the hydrocyclone, and this change indicates that the hydrocyclone was effective in removing the sand particles but some fines, which may be clay particles, could not be removed.

In view of the above, there has been described a soil washing system that has a very high throughput yet consumes very little detergent and does not require waste-water treatment. The system uses non-ionic biodegradable detergent so that any detergent residue in the cleaned solids is harmless. This non-ionic biodegradable detergent is effective in reducing total petroleum hydrocarbon content to below detection levels in just a few washing stages, due to the high efficiency of the washing stages. Recycling of the biodegradable detergent is made possible by its non-ionic character, the use of a coalescing filter, and a hydrocyclone to prevent the build-up of fines in the coalescing filter.

FIG. 9B shows a single hydrocyclone being used for solid-liquid separation in each stage of the pilot plant. In a large scale production plant, it may be desireable to use a number of hydroclones in parallel rather than a single high capacity hydrocylone for each stage to increase total plant through out.

What is claimed is:

1. A method for removing oil from soil containing said oil comprising the steps of:
   adding said soil to a detergent solution;
   agitating said soil and said detergent solution at low speed with a first horizontal rotary impeller to separate any aggregate from said soil and provide a homogenized mixture of said soil and said detergent solution;
   agitating said homogenized mixture of said soil and said detergent solution as high speed with a second horizontal rotary impeller to transfer said oil from said soil to said detergent solution;
   removing sand from a bottom portion of said homogenized mixture of said soil and said detergent solution having been agitated at high speed;
   rinsing said sand removed from said homogenized mixture; and
   recycling said detergent solution through an oil-water separator to separate said oil from said detergent solution.

2. The method as claimed in claim 1, wherein said detergent is biodegradable and non-ionic.

3. The method as claimed in claim 1, wherein said oil-water separator removes said oil from said detergent solution by coalescence upon coalescing filter medium.

4. The method as claimed in claim 1, wherein said sand is removed from said homogenized mixture by a screw elevator.

5. The method as claimed in claim 4, wherein said sand is rinsed by a series of spray nozzles when said sand is in said screw elevator.

6. The method as claimed in claim 1, wherein said method further comprises flushing a shaft of said second rotary impeller with a flow of clean fluid to prevent abrasive particles from said homogenized mixture from contacting a bearing upon which said shaft is mounted.

7. The method as claimed in claim 1, further comprising the step of separating fines from said detergent solution after said sand is removed from said detergent solution and before said detergent solution is recycled through said oil-water separator.

8. An apparatus for removing oil from soil containing said oil comprising, in combination:
   means for adding said soil to a detergent solution;
   means for agitating said soil and said detergent solution at low speed to separate any aggregate from said soil and provide a homogenized mixture of said soil and said detergent solution, said means comprising a first horizontal rotary impeller;
   means for agitating said homogenized mixture of said soil and said detergent solution at high speed to transfer said oil from said soil to said detergent solution, said means comprising a second horizontal rotary impeller;
   means for removing sand from a bottom portion of said homogenized mixture of said soil and said detergent solution having been agitated at high speed;
   means for rinsing said sand removed from said homogenized mixture; and
   means for recycling said detergent solution through an oil-water separator to separate said oil from said detergent solution.

9. The apparatus as claimed in claim 8, wherein said detergent is biodegradable and non-ionic.

10. The apparatus as claimed in claim 8, wherein said oil-water separator includes coalescing filter medium for removing said oil from said detergent solution.

11. The apparatus as claimed in claim 8, wherein said means for removing sand comprises a screw elevator.

12. The apparatus as claimed in claim 11, wherein said means for rinsing said sand comprises a series of spray nozzles mounted to said screw elevator.

13. The apparatus as claimed in claim 8, wherein said apparatus further comprises means for flushing a shaft of said second rotary impeller with a flow of clean fluid to prevent abrasive particles from said homogenized mixture from contacting a bearing upon which said shaft is mounted.

14. The apparatus as claimed in claim 8, further comprising a hydrocyclone for separating fines from said detergent solution after said sand is removed from said detergent solution and before said detergent solution is recycled through said oil-water separator.

15. An apparatus for removing oil from soil containing said oil comprising, in combination:
   means for adding said soil to a detergent solution;
   means for agitating said soil and said detergent solution to form a homogeneous mixture and transfer said oil from said soil to said detergent solution, said means comprising a horizontal rotary impeller;
   means for removing sand from a bottom portion of said homogeneous mixture;
   means for rinsing said sand removed from said homogenous mixture;
   a hydrocyclone for removing fines from said homogenous mixture having said sand removed; and
   means for recycling said detergent solution from said hydrocyclone through an oil-water separator to separate said oil from said detergent solution.

16. The apparatus as claimed in claim 15, wherein said detergent is biodegradable and non-ionic.

17. The apparatus as claimed in claim 15, wherein said means for removing sand comprises a screw elevator, and wherein said means for rinsing said sand comprises a series of spray nozzles mounted to said screw elevator.

18. The apparatus as claimed in claim 15, wherein said apparatus further comprises means for flushing a shaft of said rotary impeller with a flow of clean fluid to prevent abrasive particles from said homogenized mixture from contacting a bearing upon which said shaft is mounted.

19. The apparatus as claimed in claim 15, further comprising a secondary washing unit receiving sand from said means for removing sand, and receiving fines from said hydrocyclone.

20. The apparatus as claimed in claim 19, wherein said secondary washing unit includes a flocculation tank for clarifying washing liquid that is recycled through said secondary washing unit.

21. The apparatus as claimed in claim 15, further comprising a series of a plurality of secondary washing units which receive and successively wash sand received from said means for removing said, said plurality of secondary washing units supplying used washing liquid to a common flocculation tank and receiving recycled washing liquid from said common flocculation tank.

22. The apparatus as claimed in claim 21, wherein a first one of said secondary washing units receives fines from said hydrocyclone.

23. The apparatus as claimed in claim 20, wherein a first one of said secondary washing units includes a hydrocyclone for removing washed sand which is passed to a second one of said secondary washing units, and said apparatus includes a common flocculation tank receiving used washing liquid from the first one of said secondary washing units and receiving used washing liquid from the second one of said secondary washing units, and means for recycling washing liquid from said common flocculation tank to said first and second ones of said secondary washing units.

* * * * *